Jan. 16, 1951 J. T. WOOD 2,538,346
APPARATUS FOR DELIVERING WEIGHED QUANTITIES OF DOUGH
Filed Oct. 24, 1946 4 Sheets-Sheet 1
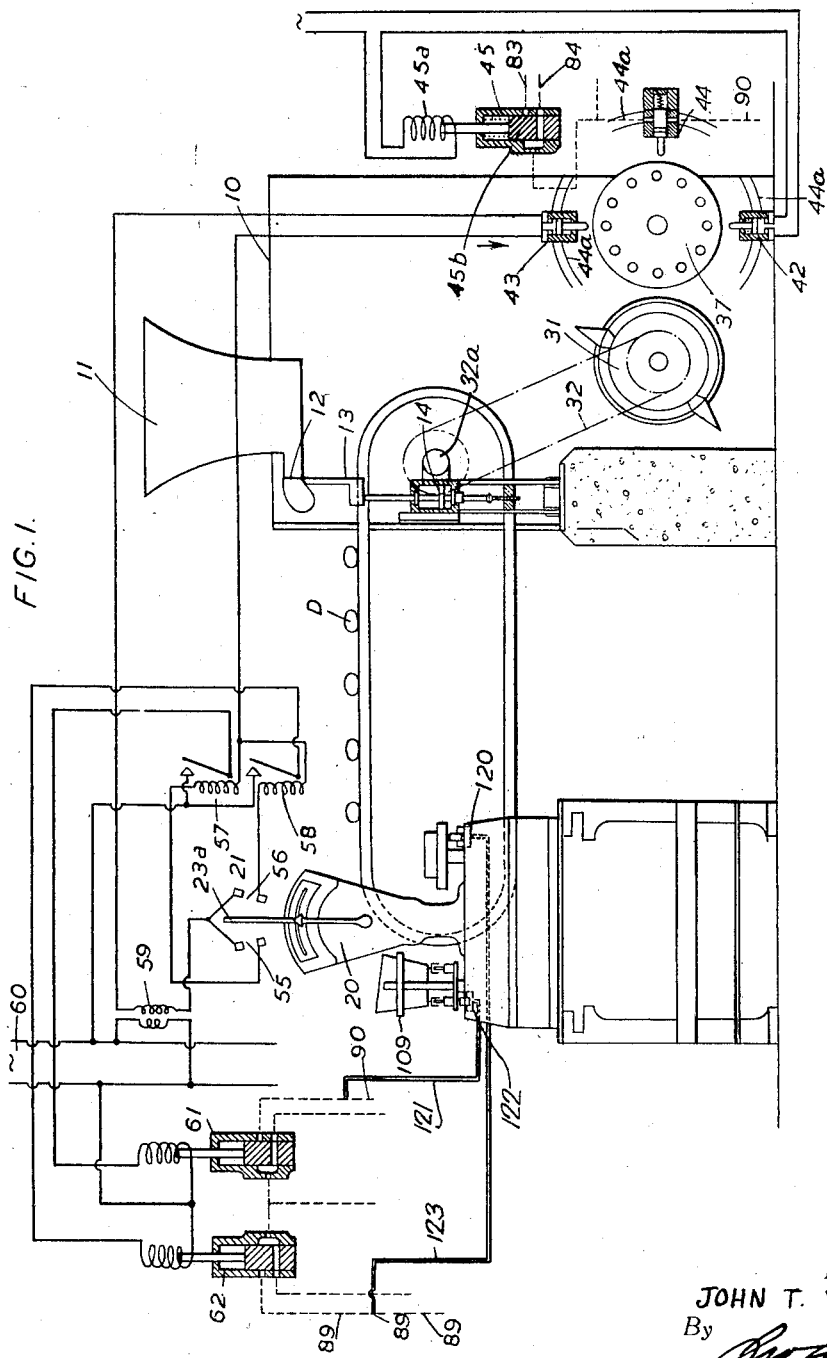
FIG.1.
Inventor
JOHN T. WOOD
By
Attorney

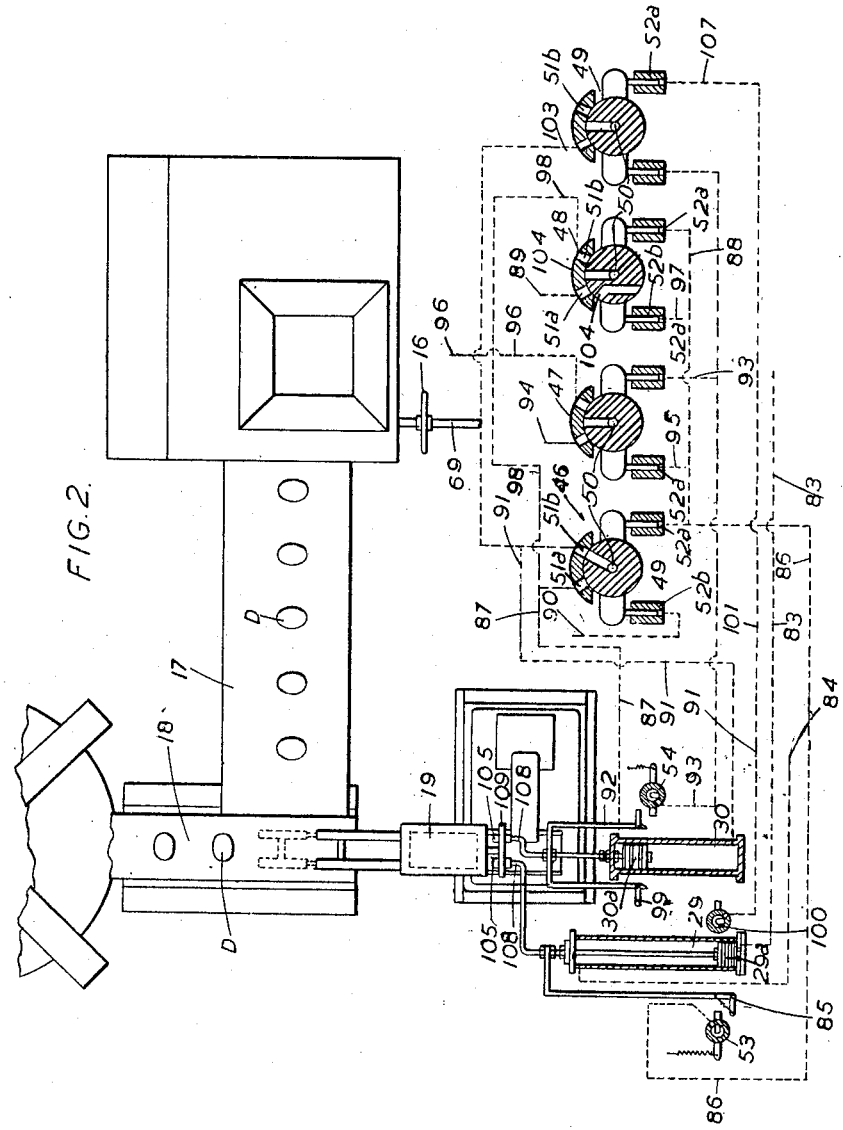

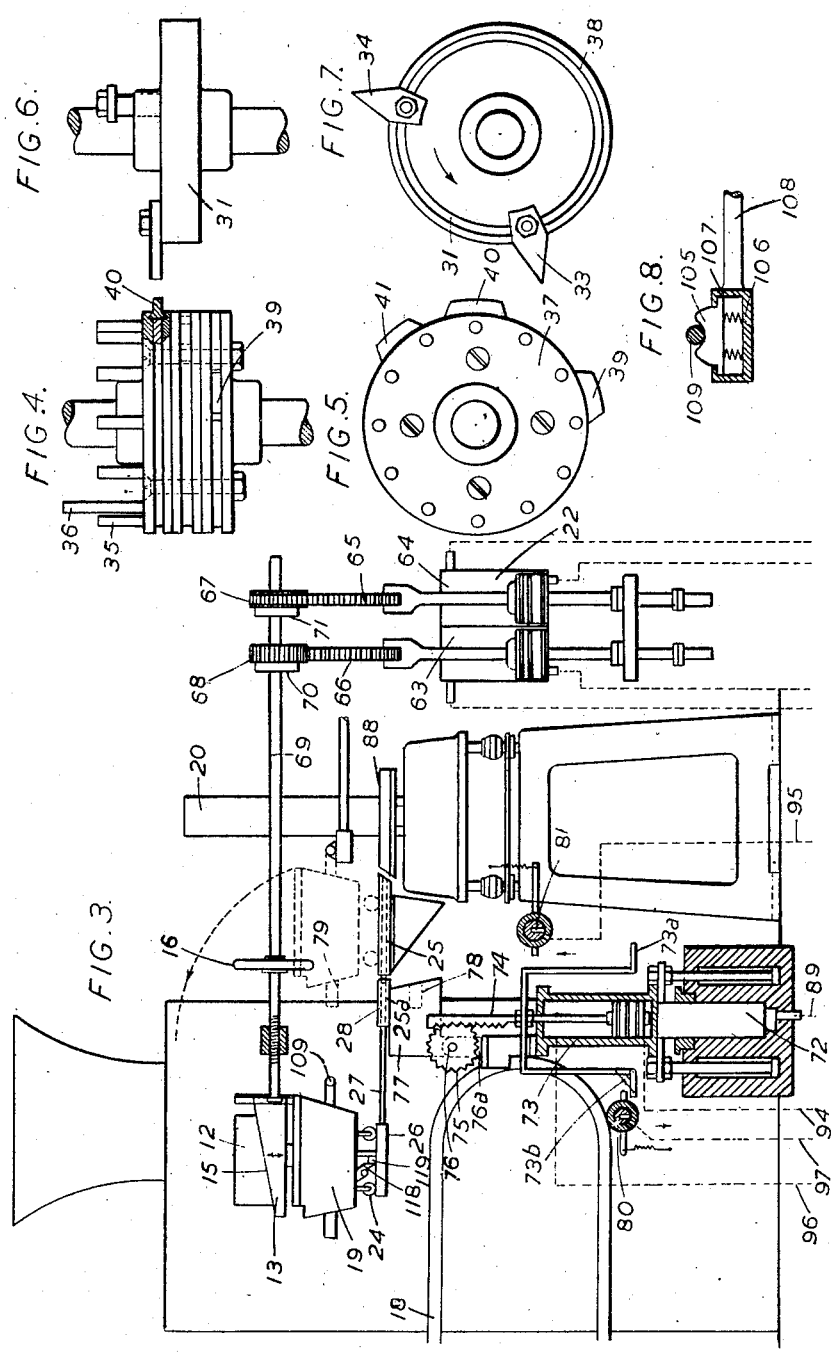

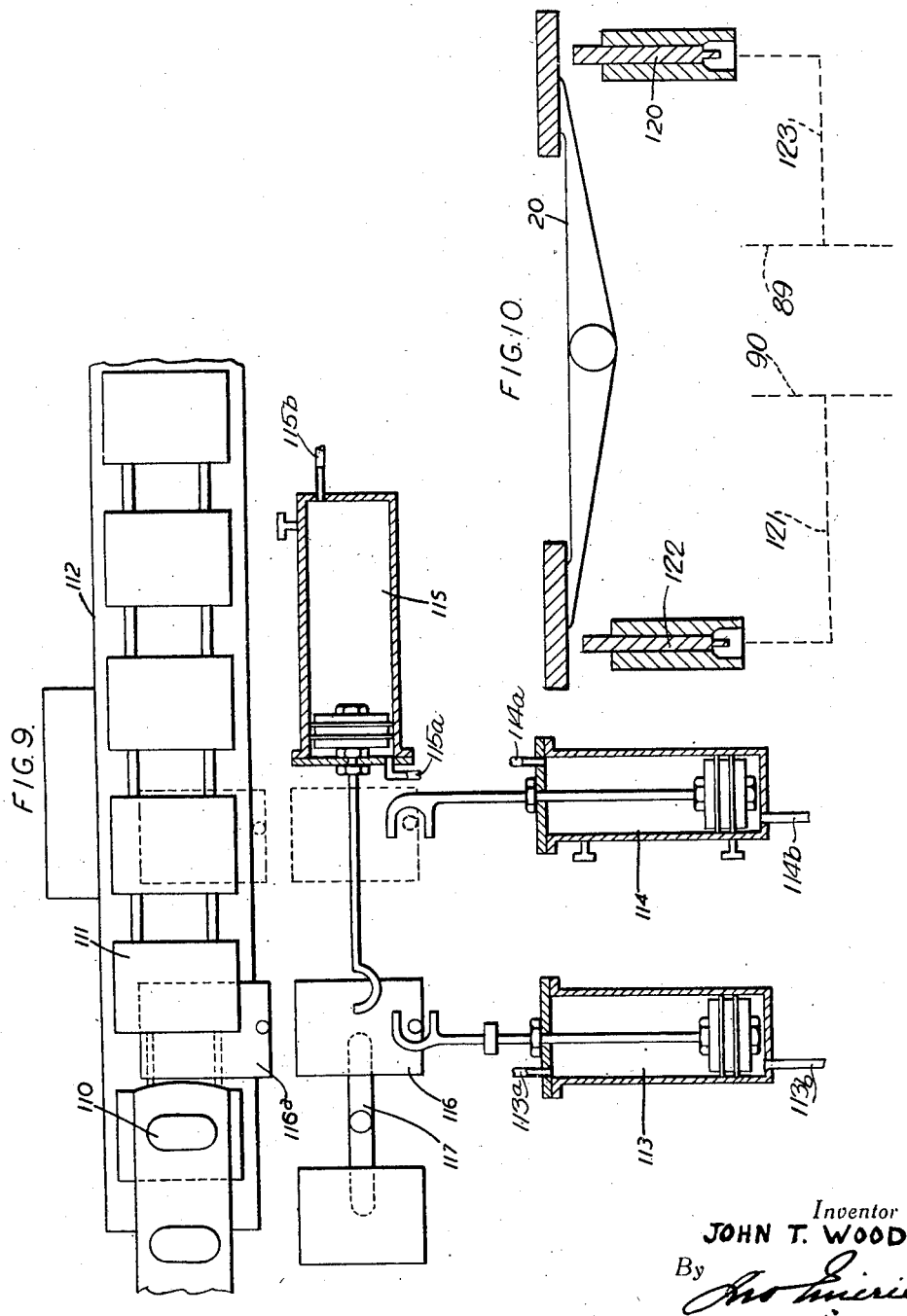

Patented Jan. 16, 1951

2,538,346

UNITED STATES PATENT OFFICE 2,538,346

APPARATUS FOR DELIVERING WEIGHED QUANTITIES OF DOUGH

John Thomas Wood, Southport, England

Application October 24, 1946, Serial No. 705,472
In Great Britain October 31, 1945

8 Claims. (Cl. 249—5)

This invention is for improvements in or relating to apparatus for delivering measured quantities of matter. The invention is particularly concerned with means for delivering accurately measured quantities of dough from a dough dividing machine such as is used in the bread-making industry.

The invention is more particularly concerned with apparatus of the kind in which one of the measured quantities is "tested" periodically after delivery and if it is, for example, too light or too heavy an appropriate adjustment is made to the delivery apparatus automatically.

One object of the present invention is to apply such apparatus to installations in which the measured quantities are delivered onto a conveyor. An example of such an installation is to be found in the bread-making industry in which measured quantities or lumps of dough are delivered from a dough dividing machine onto a conveyor belt. One problem which the present invention is designed to solve is that of periodically intercepting a piece of dough, before it reaches the conveyor, effecting a "test" weighing of the lump of dough and an appropriate adjustment of the measuring apparatus if necessary and then returning the tested lump of dough to the conveyor mechanism so that it continues its passage through the bakery.

The invention will be further described, by way of example, with reference to the accompanying diagrammatic drawings which show the invention applied to a dough dividing machine for the purpose of effecting automatic adjustment or correction to maintain the weight of the pieces of dough delivered, substantially consistent. On the drawings:

Figure 1 is a diagrammatic side elevation of the apparatus,

Figure 2 is a diagrammatic plan view of the apparatus shown in Figure 1,

Figure 3 is a diagrammatic end elevation of the apparatus shown in Figures 1 and 2, Figure 4 is an elevation of a peg wheel forming part of the automatic adjusting means according to the invention, Figure 5 is a plan view of the peg wheel shown in Figure 4, Figure 6 is an elevation of a driving wheel for stepping round the peg wheel shown in Figures 4 and 5, Figure 7 is a plan view of the driving wheel shown in Figure 6, Figure 8 is a detail sectional view of a releasable coupling arrangement for the piston rod of a piston and cylinder operating mechanism forming part of the adjusting or correcting means according to the invention, Figure 9 is a diagrammatic plan view of a modified form of the machine shown in Figures 1, 2 and 3, and Figure 10 is a detail view of a scale locking arrangement.

The dough dividing machine to which the embodiment of the invention shown on the drawings is applied is of conventional design and is indicated generally by the reference numeral 10. This machine includes a feeding hopper 11 and a discharge opening 12 for the dough. The dough is cut off (as it discharged from the opening 12) into pieces D (say 2-lbs. in weight) by a knife 13 reciprocated by a cylinder and piston device 14 operated by compressed air. The knife 13 is indicated as having an inclined edge 15 (see Figure 3) and by turning a hand-wheel 16 the knife can be adjusted longitudinally relatively to the orifice 12 so as to vary within small limits the size and weight of the piece of dough cut off at each reciprocation of the knife. Normally, the operator of the machine has to test a piece of dough for weight periodically and make any necessary adjustment by hand through the hand-wheel 16. There may be various arrangements for effecting this adjustment or correction in the weight of the pieces of dough but all or practically all entail the making of angular movement of the hand-wheel 16 or an equivalent member. The arrangement shown on the drawings is only diagrammatic but is sufficient to enable the invention to be understood inasmuch as the dough dividing machine and the adjusting mechanism therefor are of known construction.

The pieces of dough after being severed by the knife 13 fall onto a conveyor belt 17 from the end of which they fall onto a further conveyor belt 18 which carries them towards the rest of the plant including the baking ovens.

The apparatus, according to the present invention, is designed to adjust the hand-wheel 16 automatically in accordance with any variation in weight of the pieces of dough so as to eliminate the need for an operator to weigh the pieces and making the necessary adjustment.

The apparatus for effecting this, in the embodiment shown on the drawings, comprises a bucket 19 for periodically intercepting and collecting a piece of dough falling from the conveyor belt 17 to the conveyor belt 18 and carrying it to a pair of scales 20, having a pointer 23, whereon it is weighed and through an electrical system 21 and compressed air piston and cylinder devices 22 causes an appropriate angular movement of the hand-wheel 16 to correct any inaccuracy in the weight of the pieces of dough being delivered.

The bucket 19 has wheels 24 adapted to run on track sections 25 and 25a. The forward part 26 of this track is adapted itself to be moved inwardly and outwardly and for this purpose is mounted on guide rods 27 which work in guides 28 in the track sections 25 and 25a. Movement of the bucket 19 is effected by two piston and cylinder devices 29 and 30 (see Figure 2). Operation of the piston and cylinder devices 29 and 30 is controlled by the driving wheel and peg wheel mechanism shown in detail in Figures 4 to 7 inclusive and now to be described.

The driving wheel 31 shown in Figures 6 and 7 is driven in synchronism with the dough dividing machine say by a driving chain 32 from an extension 32a of the driving shaft as indicated diagrammatically at 32 in Figure 1. In practice it may be preferable to drive the wheel 31 direct from the shaft 32a. The wheel 31 carries a pair of radial fingers 33 and 34 adapted, as the wheel 31 rotates, to engage respectively with pegs 35 and a tall peg 36 on the peg wheel 37 shown in Figures 4 and 5. The fingers 33 and 34 are both adjustable circumferentially in a groove 38 in the driving wheel and by relative adjustment of these two fingers the period which elapses between two successive movements of the peg wheel can be pre-selected. The peg wheel 37 carries three cams 39, 40 and 41. The cam 39 is adapted to operate an electric switch 42 (see Figure 1). The cam 40 is adapted to operate a compressed air control valve 44 and the cam 41 is arranged to operate an electric switch 43. The cams 39, 40 and 41 are adjustable in grooves around the periphery of the peg wheel so as to pre-set their operating time and sequence. For a similar purpose the switches 42 and 43 and the valve 44 may be mounted in guides 44a to permit them to be adjusted circumferentially around the peg wheel and relatively to their operating cams and to each other. The control mechanism (see Figure 1) also includes a two-way valve 45, governed by the operation of the switch 42 and four two-way valves 46, 47, 48 and 49 shown in Figure 2. The two-way valves 46, 47, 48 and 49 have compressed air inlet ports 50 and outlet ports 51a and 51b. Operation of these valves to put the port 50 into communication with one or other of the ports 51a or 51b is effected by cylinder and piston relay devices 52a and 52b operated by compressed air.

There are also compressed air control valves 53, 54 and 100 (see Figure 2) controlled by the operation of the cylinder and piston devices 29.

The electrical system 21 (see Figure 1) is controlled by the switch 43 and comprises two pairs of contacts 55 and 56, the contacts 55 being closed by a movable contact 23a on the pointer 23 of the scales 20 when the piece of dough being weighed is light in weight, and the contacts 56 being closed by contact 23a when the piece of dough is heavy in weight. Closing of the contacts 55 or 56 operates relays 57 or 58 connected with said contacts in a secondary circuit which operates at a reduced voltage, with respect to that of the normal supply, and is coupled by a transformer 59 to the main supply 60. The relays 57 and 58 are adapted, when one or the other is closed, to operate respectively electro-magnetically actuated two-way valves 61 and 62. The valves 61 and 62 in return control the supply of compressed air to one or other of the cylinders 63, 64 of the device 22 (see Figure 3). The pistons working in the cylinders 63, 64 carry racks 65 and 66 respectively. The rack 65 engages a toothed pinion 67 whilst the rack 66 engages a toothed pinion 68. The pinions 67 and 68 are adapted to transmit angular movement to a shaft 69 which is an extension of the adjusting shaft carrying the hand-wheel 16. The racks 65 and 66 may be arranged on opposite sides of the shaft 69 so as to impart angular movement in opposite directions to the shaft and the pinions 67 and 68 drive the shaft through uni-directional driving devices 70 and 71 arranged one to cause movement of the shaft in one direction and one to cause movement of it in the opposite direction.

The means for returning the piece of dough after weighing, to the conveyor 18, comprises a compressed air lifting ram 72 and a tilting ram 73, the piston of which carries a rack 74 meshing with a pinion 75 fixed on the shaft 76 of a tilting member 77. The shaft 76 is journalled on bearings 76a. The member 77 has a socket 78 adapted to receive a spigot 79 on the bucket 19 as hereinafter described. Operation of the rams 72 and 73 also actuates compressed air control valves 80 and 81.

The operation of the apparatus above set forth will now be described:

Generally, it will be sufficient if one piece of dough D in, say, every twenty is intercepted as it falls from the conveyor 17 towards the conveyor 18. When this interception is due to take place the cam 39 closes the switch 42 and the solenoid 45a of the valve 45 is energised so that the position of the valve proper 45b is reversed and air is supplied by a conduit 83 to the outer end of the cylinder of the device 29 (see Figure 2). The piston 29a of this device then travels forwardly and moves the bucket 19 to intercept and catch a piece of dough. Immediately the switch 42 is opened by the further movement of the cam 39 the position of the valve 45 reverses and compressed air is supplied, via a conduit 84, to the other end of the cylinder of the device 29 so as to return the bucket 19 with a piece of dough in it to the position of rest (which is the position shown in dotted lines in Figures 2 and 3). During this reverse movement of the piston 29a a trigger device 85 connected to the piston rod of the piston 29a operates the valve 53 and compressed air is caused to flow via a conduit 86 to the operating relay device 52a of the valve 46. The valve 46 is then moved to put its port 49 in communication with its port 51a and air is supplied via a conduit 87 to the cylinder and piston device 30. The piston 30a of the device 30 then moves rearwardly to draw the bucket 19 with the piece of dough in it onto the weighing pan of the scales 20. The cam 41 (see Figure 1) then closes the switch 43 and makes the electricity supply available to the electrical system 21. If the piece of dough is either light or heavy then one or other of the pairs of contacts 55 or 56 is closed and this, in turn, causes operation of the associated valve 61 or 62 and compressed air is supplied to one or other of the piston and cylinder devices 63 or 64 to effect the appropriate adjustment of the shaft 69. The operation of the valve 53 (see Figure 2) by the trigger 85 as previously described also causes compressed air to be supplied via the conduit 86 and the further conduit 88 to the operating relay device 52a of the valve 48. This operation of the valve 48 enables compressed air to flow via a conduit 89 to the lifting ram 72 (see Figure 3). The ram 72 is then raised to elevate the tumbling ram mechanism 73, 74, 75, 76, 76a and 77 so that the tumbler 77 obdurates the path of movement of the bucket 19. The cam 40 then operates the valve 44 and air flows via a conduit 90 to the operating device 52b of the valve 46. This operation of the valve 46 causes compressed air to be supplied via a conduit 91 to the cylinder of the device 30. The piston 30a of this device then moves the bucket 19 so that the spigot 79 thereon (see Figure 3) engages in the socket 78 of the tumbler 77. At the end of this movement of the piston 30a a trigger mechanism 92 on the piston thereof operates the valve 54 and compressed air is supplied via a conduit 93 to the operating device 52a of the valve 47. Operation of the valve 47 in this manner allows the flow of compressed air via a conduit 94 to the cylinder of the tilting ram device 73. The ram of this device is then raised and through the rack 74 and pinion 75 tilts the member 77 and the bucket 19 so as to tumble the piece of dough intercepted back onto the conveyor 18 whereon it passes through the plant in the usual way. At the top of its stroke the ram 73, through a trigger 73a, operates the valve 81 and compressed air is supplied by a conduit 95 to the operating member 52b of the valve 47. The resultant operation of the valve 47 permits compressed air to flow via a conduit 96 to the upper end of the cylinder of the ram 73 and the ram therefore moves downwardly and returns the bucket 19 to its upright and normal position. At the end of this downward stroke a further trigger 73b of the ram device 73 operates the valve 80 and compressed air is supplied via a conduit 97 to the operating member 52b of the valve 48. Operation of the valve 48 allows compressed air to flow via a pipe 98 and the pipe 87 to the cylinder of the device 30 so that the bucket 19 is again brought temporarily into the weighing position on the scales 20 to disengage the spigot 79 from the socket 78. This movement of the piston 30a causes a trigger mechanism 99 thereon to operate a valve 100 and compressed air then flows via a conduit 101 to the operating member 52a of the valve 49. By this operation of the valve 49 compressed air is caused to flow via a conduit 103 and the conduit 91 to the device 30 and return the piston 30a and bucket 19 to the position of rest. During this latter movement of the piston 30a the trigger mechanism 92 operates the valve 54 to reverse the position of the valve 49 ready for the next weighing operation. The valve 48 has an exhaust port 104 and during the temporary positioning of the bucket 19 on the scale pan as just described the ram of the ram device 72 is permitted to descend. The connecting pipes will be made flexible where necessary to permit movement of parts such as the rams 72 and 73.

It will be appreciated that the coupling between the piston rods of the devices 29 and 30 and the pan 19 must be such that the pan can over-ride the coupling when necessary. A form of coupling which permits this is shown in Figure 8. This coupling comprises a coupling member proper 105 which is supported by springs 106 in a casing 107 on the outer end of the piston rod 108. The coupling member is adapted to engage a part 109 on the bucket 19 and to move the bucket provided there is no great resistance to such movement. When, however, it is required that the bucket should move independently of the coupling (as when the piston rod of the device 29 takes over from the piston rod of the device 30) the coupling member 105 can "give" sufficiently to permit the member 109 to disengage itself. This form of coupling member also permits the required tilting of the bucket to return the weighed piece of dough back to the conveyor 18. The bucket 19 also carries a pivoted detent 118 which engages automatically with an abutment 119 on the track part 26 when it is required that this track part should move as previously described.

Figure 9 shows a slightly modified arrangement to that above described, in which the pieces of dough are dropped from a conveyor 110 into baking tins 111 carried in a further conveyor 112. The problem here is to intercept a piece of dough falling from the conveyor 110, weigh it and effect the necessary adjustment of the shaft 69 and then return the dough to the empty tin 111 it would have occupied had it not been intercepted. This is effected by three piston and cylinder devices 113, 114 and 115. The device 113 first pushes a bucket 116 into the position indicated at 116a so as to intercept the piece of dough and then draws it back to the weighing mechanism indicated diagrammatically at 117 whereon it is weighed and the appropriate adjustment of shaft 69 is effected. The cylinder and piston device 115 then takes over and draws the bucket 116 to the right, after which it is pushed forward by the device 114 and tilted by a similar mechanism to that described with reference to Figure 3 so that the piece of dough falls into its appropriate baking tin. Devices 113, 114 and 115 are operated by compressed air supplied through pipe lines 113a and 113b, 114a and 114b, and 115a and 115b, the supply of compressed air at appropriate times can be controlled, as will readily be understood, by a peg wheel and valve mechanism similar to that described with reference to Figures 1, 2, 4, 5, 6 and 7.

Figure 10 shows an arrangement for locking the scales after the dough has been weighed so as to prevent further and wrong movement of the scale pans which may be caused by say, vibration. This arrangement is also shown in Figure 1 and comprises a small air line 121 connected to the conduit 90 and the underside of a locking piston device 122 and a further air line 123 from the conduit 89 to the underside of a further locking-piston device 120. If the piece of dough being weighed is heavy the appropriate solenoid is energised, the double-acting valve 61 lifted and air passes along the air line 121 from the conduit 90 and the piston 122 is lifted so as to lock the scale pans in the heavy position until the solenoid of the valve 61 is deenergised. If the piece of dough weighed is light, compressed air passes along the air line 123 from the conduit 89 to the other piston 120 so as to lock the scale pans in the light position.

Whilst the invention has been described more particularly as applied to a dough dividing machine it can be applied generally to machines delivering articles or pieces of matter and in which it is required to effect some automatic adjustment of the machine in accordance with a test made automatically and periodically on one of the articles or pieces delivered.

I claim:

1. The combination with a dough dividing machine for delivering pieces of dough in measured weights and including a correcting mechanism for adjusting the dough dividing means to correct variations in the weight of the pieces of dough delivered, weighing means for periodically testing the weight of one of said pieces of dough and including two electric contact devices, one of said contact devices operating on over-weight and the other on under-weight of the pieces of dough, means for periodically and automatically causing a piece of dough to be received by the weighing means, and means controlled by said contact devices and for operating said correcting mechanism, whereby said correcting mechanism is adjusted to correct any variations in the weight of subsequent pieces of dough delivered as ascertained by the weighing means.

2. The combination with a dough dividing machine for delivering pieces of dough in measured weights and including a correcting mechanism for adjusting the dough dividing means to correct variations in the weight of the pieces of dough delivered, a conveyor located to receive said pieces of dough as they are delivered from the dividing machine, weighing means for periodically testing the weight of one of said pieces of dough, and including two electric contact devices, one of said contact devices operating on over-weight and the other on under-weight of the pieces of dough, means for diverting a piece of dough periodically and automatically from the conveyor to said weighing means, and means controlled by said contact devices and for operating said correcting mechanism, whereby said correcting mechanism is adjusted to correct any variations in the weight of subsequent pieces of dough delivered as ascertained by the weighing means.

3. The combination with a dough dividing machine for delivering pieces of dough in measured weights and including a correcting mechanism for adjusting the dough dividing means to correct variations in the weight of the pieces of dough delivered, a conveyor located to receive said pieces of dough as they are delivered from the dividing machine, weighing means for periodically testing the weight of one of said pieces of dough and including two electric contact devices, one of said contact devices operating on over-weight and the other on under-weight of the pieces of dough, means for diverting a piece of dough periodically and automatically from the conveyor to said weighing means, electro-magnetic devices in circuit with said contact devices to be energized thereby, and means controlled by said electromagnetic devices for operating said correcting mechanism, whereby said correcting mechanism is adjusted to correct any variations in the weight of subsequent pieces of dough delivered as ascertained by the weighing means, and means for returning the weighed piece of dough to the conveyor.

4. The combination with a dough dividing machine for delivering pieces of dough in measured weights and including a correcting mechanism for adjusting the dough dividing means to correct variations in the weight of the pieces of dough delivered, a conveyor located to receive said pieces of dough as they are delivered from the dividing machine, weighing means for periodically testing the weight of one of said pieces of dough and including two electric contact devices, one of said contact devices operating on over-weight and the other on under-weight of the pieces of dough, means for diverting a piece of dough periodically and automatically from the conveyor to said weighing means, electro-magnetic devices in circuit with said contact devices to be energized thereby, and means controlled by said electromagnetic devices for operating said correcting mechanism, whereby said correcting mechanism is adjusted to correct any variations in the weight of subsequent pieces of dough delivered as ascertained by the weighing means, and means for returning the weighed piece of dough to the conveyor timed to operate so that the piece of dough is delivered to the portion of the conveyor it would have occupied had it not been diverted.

5. The combination with a dough dividing machine for delivering pieces of dough in measured weights and including a correcting mechanism for adjusting the dough dividing means to correct variations in the weight of the pieces of dough delivered, weighing means for periodically testing the weight of one of said pieces of dough and including two electric contact devices, one of said contact devices operating on over-weight and the other on under-weight of the pieces of dough, means for bringing the weighing pan of said weighing means periodically and automatically into a position to intercept one of the pieces of dough delivered by the dividing machine, and means controlled by said contact devices and for operating said correcting mechanism, whereby said correcting mechanism is adjusted to correct any variations in the weight of subsequent pieces of dough delivered as ascertained by the weighing means.

6. The combination with a dough dividing machine for delivering pieces of dough in measured weights and including a correcting mechanism for adjusting the dough dividing means to correct variations in the weight of the pieces of dough delivered, weighing means for periodically testing the weight of one of said pieces of dough and including two electric contact devices, one of said contact devices operating on over-weight and the other on under-weight of the pieces of dough, means for diverting a piece of dough periodically and automatically to said weighing means, an operative control connection, via said two electric contact devices, between the weighing means and the correcting mechanism, whereby said correcting mechanism is adjusted to correct any variations in the weight of subsequent pieces of dough delivered as ascertained by the weighing means, means for discharging the weighed pieces of dough from the weighing means and means for synchronizing the operation of the diverting means, the weighing means and the means for discharging the weighed piece of dough with the operation of the delivering apparatus, said synchronizing means including a driving wheel and a driven peg wheel, the driving wheel having at least two driving fingers arranged out of phase and in different planes and the peg wheel having at least one tall peg to be engaged by one of said fingers.

7. The combination with a dough dividing machine for delivering pieces of dough in measured weights and including a correcting mechanism for adjusting the dough dividing means to correct variations in the weight of the pieces of dough delivered, of a pair of differentially acting piston and cylinder devices for operating said correcting mechanism, a weighing mechanism including two electric contact devices, one of which is closed on over-weight and the other on under-weight of the pieces of dough, means for causing the weighing pan of the weighing mechanism periodically and automatically to intercept a piece of dough delivered from the dividing machine, and electro-magnetically operated valves controlling a flow of compressed air to said piston and cylinder devices for operation thereof, the electric circuits of said valves being connected respectively one to each of said contact devices of the weighing means, whereby one of said piston and cylinder devices is operated to correct overweight and the other to correct under-weight of the pieces of dough.

8. The combination with a dough dividing machine for delivering pieces of dough in measured weights and including a correcting mechanism for adjusting the dough dividing means to correct variations in the weight of the pieces of dough delivered, of a pair of differentially acting piston and cylinder devices for operating said correcting mechanism, a weighing mechanism including two electric contact devices one of which is closed on over-weight and the other on under-weight of the pieces of dough, electromagnetically operated valves controlling a flow of compressed air to said piston and cylinder devices, the electric circuits of said valves being connected respectively one to each of said contact devices of the weighing means, whereby one of said piston and cylinder devices is operated to correct overweight and the other to correct under-weight of the pieces of dough, a collecting bucket, piston and cylinder devices for moving said bucket periodically to intercept a piece of dough falling from the delivering machine and carrying said piece of dough to the weighing mechanism and subsequently discharging it, valves controlling the flow of compressed air to said bucket-moving piston and cylinder devices for operation thereof, a cam mechanism operated by and in synchronism with the delivering machine and operating in sequences said valves, and further valves operated by the piston and cylinder devices themselves and also controlling the operation of the first mentioned valves.

JOHN THOMAS WOOD.

REFERENCES CITED

The following references are of record in the file of this patent:

UNITED STATES PATENTS

| Number | Name | Date |
| --- | --- | --- |
| 809,443 | Hohnbach | Jan. 9, 1906 |
| 970,826 | Hoyt | Sept. 20, 1910 |
| 1,914,985 | Thomas | June 20, 1933 |
| 2,324,667 | Baker et al. | July 20, 1943 |